US011121941B1

(12) United States Patent
Johnston et al.

(10) Patent No.: US 11,121,941 B1
(45) Date of Patent: Sep. 14, 2021

(54) MONITORING COMMUNICATIONS TO IDENTIFY PERFORMANCE DEGRADATION

(71) Applicant: Cisco Technology, Inc., San Jose, CA (US)

(72) Inventors: Jay Kemper Johnston, Raleigh, NC (US); Magnus Mortensen, Cary, NC (US); David C. White, Jr., St. Petersburg, FL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/817,577

(22) Filed: Mar. 12, 2020

(51) Int. Cl.
*H04L 12/24* (2006.01)
*H04L 29/06* (2006.01)
*H04L 12/26* (2006.01)
*H04L 29/08* (2006.01)

(52) U.S. Cl.
CPC .......... *H04L 41/5038* (2013.01); *H04L 43/08* (2013.01); *H04L 67/10* (2013.01); *H04L 67/42* (2013.01)

(58) Field of Classification Search
CPC ..... H04L 41/5038; H04L 67/42; H04L 43/08; H04L 67/10
See application file for complete search history.

(56) References Cited

U.S. PATENT DOCUMENTS

| 6,393,483 B1 | 5/2002 | Latif et al. |
| 10,455,060 B2 | 10/2019 | Deiretsbacher et al. |
| 2015/0358391 A1* | 12/2015 | Moon ............ G06F 11/34 709/224 |
| 2019/0068509 A1 | 2/2019 | Hyatt et al. |
| 2019/0303274 A1* | 10/2019 | Funnell ............ G06F 16/7837 |

FOREIGN PATENT DOCUMENTS

WO WO2019040771 A1 2/2019

OTHER PUBLICATIONS

Miano et al., Introducing Smartnics in Server-Based Data Plane Processing: The DDOS Mitigation Use Case, IEEE Access, vol. 7, pp. 107161-107169, Aug. 6, 2019.

* cited by examiner

*Primary Examiner* — El Hadji M Sall
(74) *Attorney, Agent, or Firm* — Lee & Hayes, P.C.

(57) ABSTRACT

This disclosure describes techniques for monitoring communications in an application cloud infrastructure. The techniques may include determining whether a performance issue associated with the communications is related to an application server for a hosted application, or to a computing network that transmits the communications across the application cloud infrastructure. The techniques may also further include testing to define a performance issue, and/or taking action in response to a performance issue, including potentially mitigating the performance issue. As such, monitoring communications may help improve network performance by efficiently identifying and isolating instances of potential performance degradation.

20 Claims, 13 Drawing Sheets

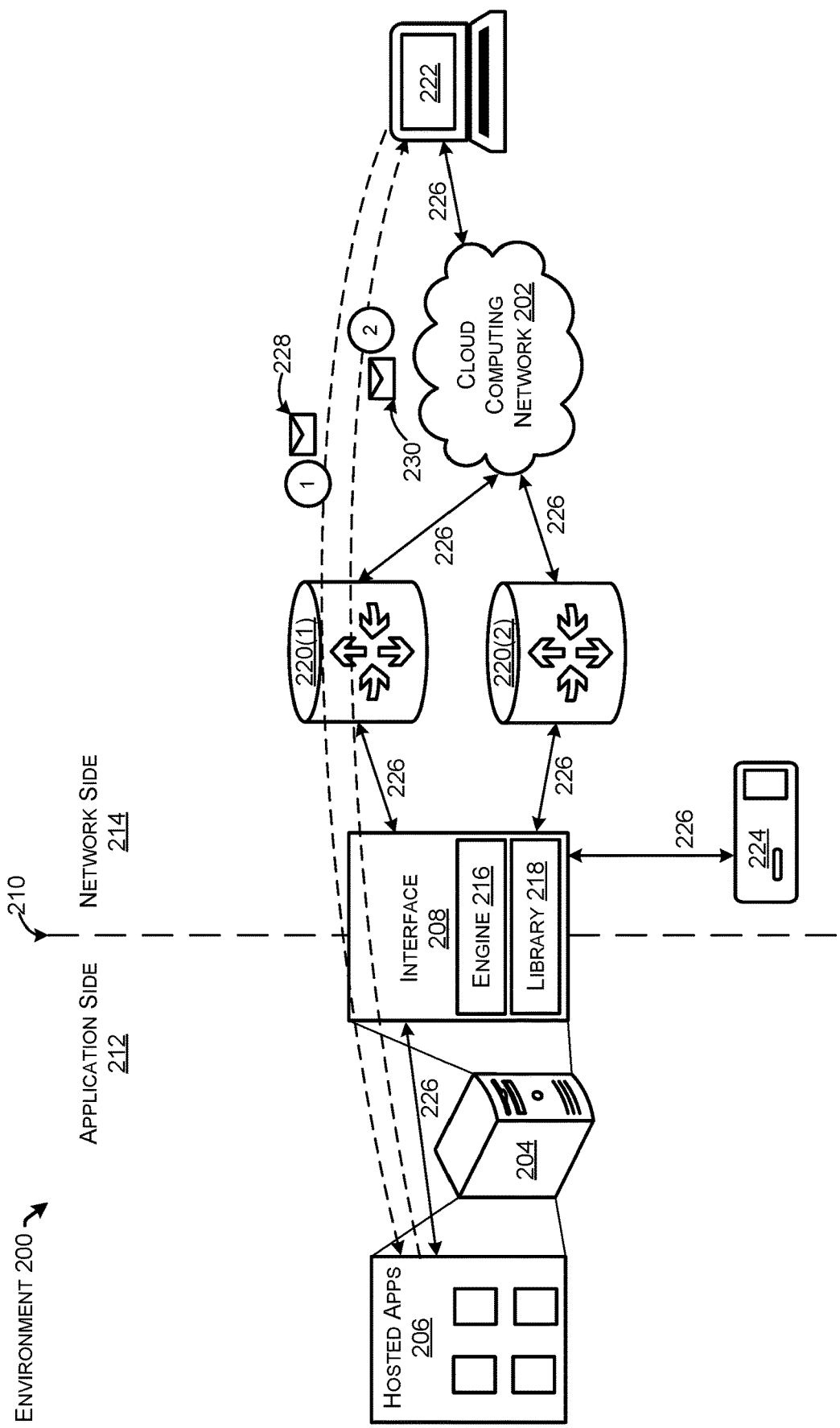

MONITORING COMMUNICATIONS TO IDENTIFY PERFORMANCE DEGRADATION

TECHNICAL FIELD

The present disclosure relates generally to monitoring communications between a computing network and a hosted application to identify performance degradation.

BACKGROUND

With increasing complexity in application cloud infrastructures, performance issues can be difficult to diagnose. For example, a network operations center may receive a relatively vague indication that a cloud-hosted application is "slow." However, a performance issue may be caused by a variety of disparate problems, such as issues with the computing network and/or operation of the application itself. The initial indication of the performance issue may provide little additional information to help differentiate a root cause in a complicated application cloud infrastructure. Therefore, to make progress on resolving the performance issue, the network operations center may have to wait for separate teams to investigate different potential root causes. Ultimately, it may take hours into a service outage to resolve application performance issues.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

Figure 1A:
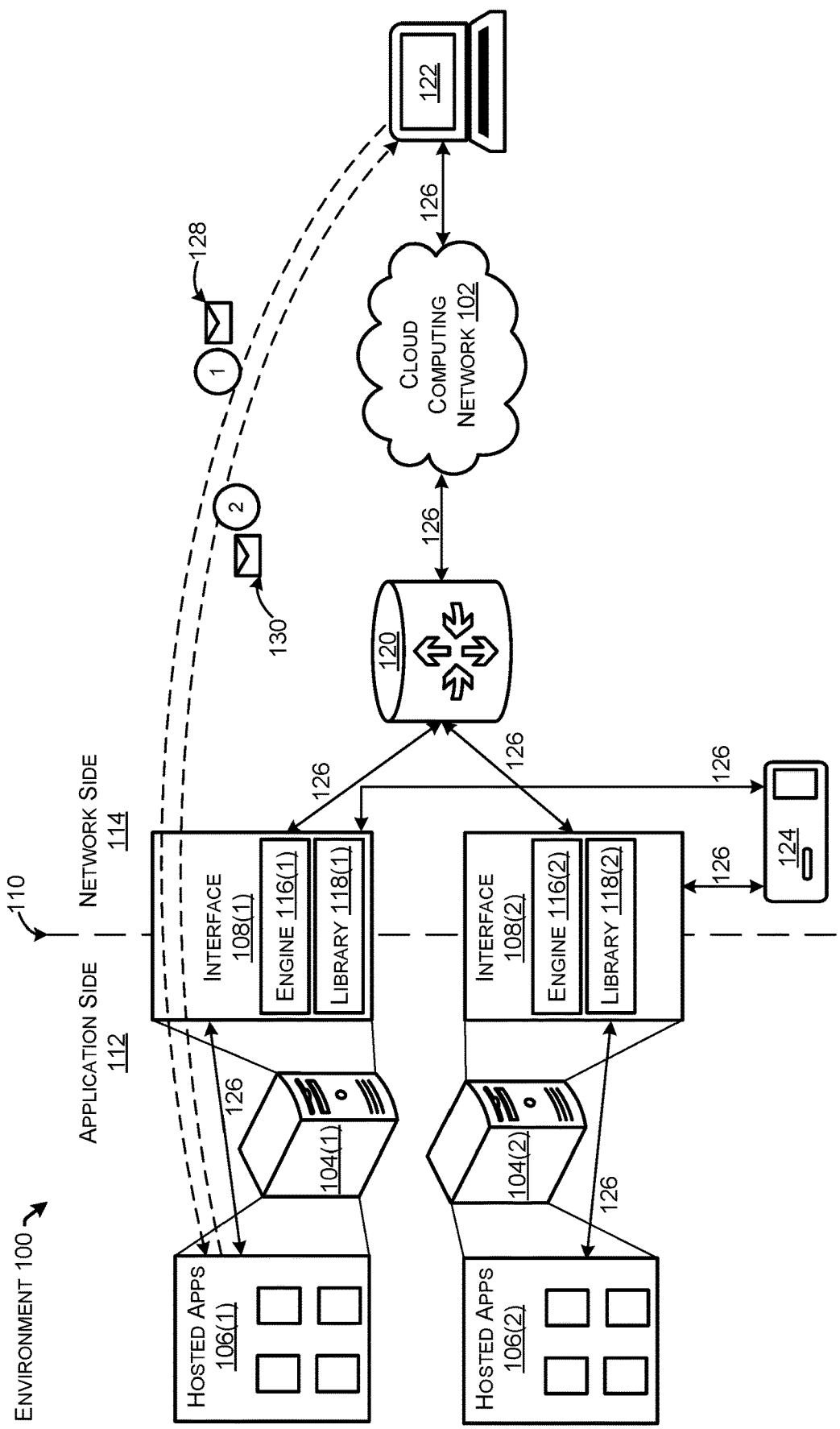
FIGS. 1A-2C illustrate component diagrams with example environments in which communications monitoring may be employed by an interface device, in accordance with the present concepts.

This disclosure describes a method that may be implemented by an interface device located on an application server communicatively coupled to a client device via a computing network. The method may include monitoring, at an interface between the application server and the computing network, one or more communications sent from the client device via the computing network to a hosted application at the application server, the one or more communications associated with the service provided by the hosted application. The method may also include monitoring, at the interface, one or more responses sent from the hosted application to the client device, the one or more responses corresponding to the service. The method may include identifying a performance issue associated with the service based at least in part on the monitoring the one or more communications and the monitoring the one or more responses. Further, the method may include determining whether the performance issue is associated with the hosted application or the computing network. Based at least in part on whether the performance issue is associated with the hosted application or the computing network, the method may include performing an action responsive to the performance issue.

This disclosure also describes a method that may be implemented by an interface device located on an application server communicatively coupled to a client device via a computing network. The method may include monitoring, at an interface between an application server and a computing network, one or more communications sent from a client device via the computing network to a hosted application at the application server, the one or more communications associated with the service provided by the hosted application. The method may include monitoring, at the interface, one or more responses sent from the hosted application to the client device, the one or more responses corresponding to the service. The method may also include identifying a performance issue associated with the service based at least in part on the monitoring the one or more communications and the monitoring the one or more responses. In some examples, the method may include determining that the performance issue is associated with the hosted application. Responsive to the performance issue, the method may include redirecting a subsequent communication associated with the service to a different application server.

This disclosure also describes a method that may be implemented by an interface device located on an application server communicatively coupled to a client device via a computing network. The method may include monitoring, at an interface between an application server and a computing network, one or more communications sent from a client device via the computing network to a hosted application at the application server, the one or more communications associated with the service provided by the hosted application. The method may include monitoring, at the interface, one or more responses sent from the hosted application to the client device, the one or more responses corresponding to the service. The method may also include identifying a performance issue associated with the service based at least in part on the monitoring the one or more communications and the monitoring the one or more responses. In some examples, the method may include determining that the performance issue is associated with the computing network. Responsive to the performance issue, the method may include bypassing a portion of the computing network that is associated with the performance issue.

Additionally, the techniques described herein may be performed by a system and/or device having non-transitory computer-readable media storing computer-executable instructions that, when executed by one or more processors, performs one or more of the methods described above.

EXAMPLE EMBODIMENTS

This disclosure describes techniques for monitoring and/or isolating performance issues in a hosted application offered via an application cloud infrastructure. The techniques may include determining whether any given performance issue is related to an application server (e.g., host, computing device), or to a computing network that transmits communications associated with the hosted application. In some implementations, the techniques may be performed by a container and/or application running on an interface device located at a demarcation point between the application server and the computing network. As such, the interface device may actively monitor communication flows travelling to and from the hosted application. The techniques may also further include testing to identify a performance issue, and/or taking action in response to a performance issue, including potentially mitigating the performance issue.

The position of the interface device, located between the application server and the computing network, may be viewed as an advantageous vantage point from which to monitor communications (e.g., requests, messages, data, packets, transactions, etc.) and isolate performance issues. For example, the interface device may be able to differentiate from which direction a performance issue is originating. Stated another way, the interface device may be able to leverage its position to definitively and quickly narrow down whether the performance issue is being caused by the application server on one side of the interface device, or by the computing network (e.g., the Internet, the "rest of the world") on the other side of the interface device. Further, where the interface device is actually positioned on a specific application server, the techniques may include differentiating whether the specific application server might be causing any given performance issue. Envision, for instance, interface devices located on each application server in a server bank, pinpointing whether corresponding hosted applications on each of the application servers are performing properly.

As used herein, a performance issue may include a variety of conditions that cause a hosted application to underperform expectations for performance and/or operation, and/or to fail. In general, possible performance issues may be viewed as originating with an application server and/or hosted application itself (e.g., application side), or with the computing network (e.g., network side). Example performance issues originating with the application server may include transmission control protocol (TCP)-type issues, such as re-transmissions due to packet drops, TCP windowing problems due to endpoint buffering, and/or other TCP performance issues. Some example performance issues may be related to HyperText Transfer Protocol (HTTP) application programming interface (API) requests, such as delays in servicing inbound HTTP API requests, failures to service inbound HTTP API requests (e.g., 404 errors), etc. In some cases performance issues originating with the application server may relate to problems with meeting service level agreements (SLAs), such as inbound HTTP API requests that are not serviced by the hosted application fast enough to meet an SLA requirement, etc. Performance issues with application servers may also include physical equipment failures, etc. On the network side, example performance issues originating with the computing network may include secure socket layer (SSL) or transport layer security (TLS) client problems, unsupported ciphers, inbound denial of service (DOS) or distributed denial of service (DDOS) attacks, packet drops on the computing network, physical hardware issues with any of a variety of network devices, etc. Performance issues on the network side may also include problems originating with a client device, such as high latency and/or jitter from a client device.

The interface device may be manifest as any of a variety of types of devices capable to performing some or all of the techniques described herein. In general, the interface device may be considered a computer hardware component that connects a computer (e.g., application server) to a computing network. Some examples of an interface device in accordance with the present concepts may include a network interface controller or network interface card (NIC), a network adapter, a LAN adapter, a physical network interface, a Smart NIC, an intelligent server adapter (ISA), etc. The interface device may include an active diagnostic and/or testing container. The interface device may use a problem detection engine to detect problems it observes, such as performance issues at different open systems interconnection (OSI) layers. The interface device may also include or have access to an Intellectual Capital (IC) library, and/or may be embedded with detection signatures. By observing communication flows associated with the hosted application, the interface device may be able to determine whether the hosted application, the application server, and/or the computing network is the cause of a performance issue. Further, the interface device may be able to determine which leg of the computing network is the cause of a computing network-related performance issue.

Aside from simply detecting a relative performance issue (e.g., latency, dropped packets), the interface device may also identify a performance issue based on specific performance criteria related to the hosted application. For instance, the interface device may have knowledge of the actual service being offered by the hosted application. With knowledge of the service, such as SLA details, expected data sizes, or other corresponding metrics, the interface device may monitor communications to ensure that the application server is servicing client devices correctly (e.g., meeting the SLA). Stated another way, specific performance criteria (e.g., a response time in an SLA) for hosted applications can be programmed into the interface device so that the interface device knows what performance it may consider "healthy." In this manner, the interface device may be able to identify performance issues based on general performance criteria, performance criteria specific to any given hosted application, and/or changing performance criteria, etc.

In some examples, the interface device may respond to a performance issue by taking an action. An action may be simple, such as sending a message regarding the performance issue to a controller (e.g., central controller). Continuing with the example described above, in an instance where the response time no longer meets an SLA requirement, the interface device may be further programmed to alert a controller. The controller may then follow up by moving an affected application offline, for instance.

In some cases, the interface device may perform an action such as initiating and/or participating in testing of a hosted application, the computing network, and/or other aspects of the system to identify and/or define a potential performance issue. For example, the interface device may send requests towards the hosted application, such as unit tests. The requests may be fabricated, intended to emulate a request from a client device, and/or may be requests collected from real client devices that are replayed by the interface device for testing purposes. The interface device may perform continuous, active, and/or ongoing testing, may perform testing at regular or irregular intervals, and/or may perform testing in response to some perceived or suspected performance issue or in response to some other trigger. As such, the interface device may be capable of detecting whether a hosted application would fail to serve a client device even before the client device sends a request to the application server. Furthermore, the interface device may participate in a coordinated effort to identify, define, and/or diagnose a performance problem by working with other interface devices to perform testing of multiple application servers and/or sections of a computing network.

An action performed by the interface device may also include attempting to mitigate the performance issue. Mitigation techniques available to the interface device may include redirecting a subsequent inbound communication and/or application request to a different, healthier, application server. The interface device may communicate with another interface device and/or with a controller to find another application server to which to direct the subsequent inbound communication, for instance. Further, the interface device may be able to determine that an available application server is not currently affected by the performance issue. In some cases, an action performed by the interface device may include bypassing a portion of the computing network that is experiencing a performance issue. For instance, if the interface device determines that a particular data path through the computing network is dropping communications, the interface device can avoid that particular path for future communications. The interface device may employ source routing to determine a new route for communications over the computing network. In some implementations, an action by the interface device may include a modification of its own settings to improve performance. For example, the interface device may increase or reduce a transmission control protocol (TCP) maximum segment size (MSS) or interface maximum transmission unit (MTU), modify in memory buffer and/or queue sizes, etc.

To summarize, the position of an interface device between an application server and a computing network provides a unique vantage point from which to monitor communications. From this vantage point, the interface device may be able to quickly and accurately determine whether an observed performance issue is originating from an application side or a network side of an application cloud infrastructure. The interface device may be capable of alerting a central controller regarding the performance issue. Furthermore, the interface device may be initiate mitigating action to help resolve the performance issue. The techniques performed by the interface device may be viewed as a lightweight mechanism for improving network operations, featuring both relatively low computational cost and relatively low bandwidth usage. As such, the techniques described herein for monitoring, isolating, and/or mitigating performance issues would be significantly useful to data center operators and/or other computing networks. These techniques may help dramatically lower total cost of ownership (TCO) by reducing outage times, diagnosing problems faster, and improving performance of applications and/or computing networks.

Although the examples described herein may refer to an interface device located on an application server and adjacent to a computing network, the techniques can generally be applied to any device in a network. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of time to diagnosis and/or mitigation of a performance issue, computational resource use, storage, dropped data, latency, and other issues experienced in networks due to undiagnosed problems, lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIGS. 1A-1E collectively illustrate an example environment 100 in accordance with the present communications monitoring concepts. Example environment 100 may include computing network 102 (e.g., network, cloud computing network) and one or more application servers 104 (e.g., servers, hosts). Two application servers 104 are shown in FIGS. 1A-1E. Parentheticals are utilized after a reference number to distinguish like elements. Use of the reference number without the associated parenthetical is generic to the element. As shown in FIGS. 1A-1E, an application server 104 may host one or more hosted applications 106 (generally represented by boxes). In some examples, the hosted applications 106 may be viewed as being provided via containers and/or virtual machines. For instance, the boxes shown with hosted applications 106(1) may be considered independent containers for separate instances of a hosted application 106. An application server may include one or more interface devices 108 (e.g., NIC). In some examples, the interface device 108 may be positioned at an imaginary interface 110 (represented by a dashed line) between an application side 112 and a network side 114 of environment 100. The interface device 108 may include an engine 116 and/or a library 118. Although described herein as comprising an NIC and/or smart NIC, the interface device 108 may be implemented as any type of hardware-based and/or software-based implementation for monitoring communications between the application side 112 and network side 114. As an example, the interface device 108 may comprise a container, and/or a function running in a container, virtual machine, etc. (or other virtual resource), for monitoring the communications between the application side 112 and network side 114. Referring again to FIGS. 1A-1E, the interface device(s) 108 may be connected to the computing network 102 via a router 120. Environment 100 may also include at least one client device 122 and/or a controller 124.

In general, application servers 104, interface devices 108, routers 120, client devices 122, controllers 124, and/or other devices may be communicatively coupled. Within the example environment 100, these various devices may exchange communications (e.g., packets) via a network connection(s) to computing network 102, indicated by double arrows 126. For instance, network connections 126 may be transport control protocol (TCP) network connections or any network connection (e.g., user datagram protocol (UDP)) that enables the application servers 104 to exchange packets with other devices via computing network 102. The network connections 126 represent, for example, data paths between the application servers 104 and client device 122. It should be appreciated that the term "network connection" may also be referred to as a "network path." The use of a cloud computing network in this example is not meant to be limiting. Other types of networks are contemplated in accordance with the present communication monitoring concepts. Further, the client device 122 may be a computer, laptop, mobile device, tablet, etc., and the application server(s) 104 may be a network device that is configured to provide data and/or network services to the client device 122. The application server(s) 104 may or may not necessarily be a producer, a point of generation, and/or origination of data. For instance, data may originate elsewhere for the application server(s) 104 to be able to provide to the client device 122. Alternatively or additionally, data may pass through other network devices (e.g., interface device 108, router 120, a switch, etc.) on a path from the application server(s) 104 to the client device.

FIGS. 1A-1E show several examples of communications and/or actions between client device 122, hosted applications 106 on application servers 104, and various other network devices in environment 100. The communications are indicated with dashed, numbered lines. For example, referring to FIG. 1A, at "Step 1," client device 122 may send a request 128 to application server 104(1). Request 128 may be a request for data from a hosted application 106(1) on application server 104(1). For instance, application server 104(1) may be a producer of data and client device 122 may be a consumer of data produced by application server 104(1). At "Step 2," in some cases, application server 104(1) may send a response 130 to client device 122.

In some implementations, as client device 122 and application server 104(1) communicate with each other, interface device 108(1) may monitor the request 128, the response 130, and/or any other communications passing between client device 122 and application server 104(1). For example, engine 116(1) of interface device 108(1) may monitor the communications for a hosted application 106. Interface device 108(1) may compile metadata associated with the communications, such as travel times of the communications between devices, etc. In some cases, interface device 108(1) may check the metadata against information in library 118(1). Library 118(1) may contain information related to an SLA for a hosted application 106(1), for instance. Through such monitoring and/or checking activities, engine 116(1) may identify a performance issue.

Figure 1B:
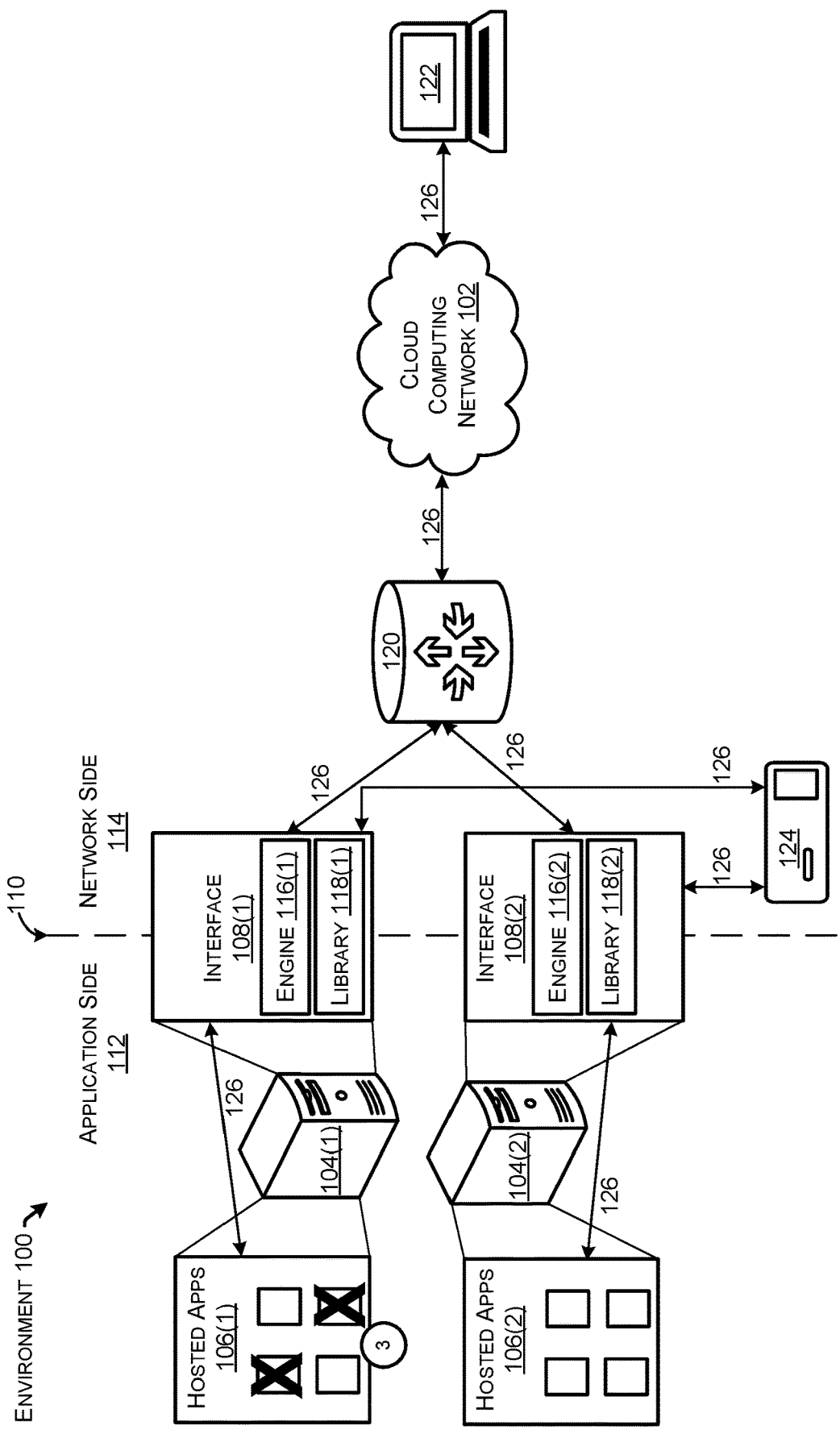

At "Step 3" in FIG. 1B, interface device 108(1) may identify a performance issue with at least one of the hosted applications 106(1), represented as boxes with "X" marks. Since interface device 108(1), which is onboard application server 104(1), is located at a demarcation point between the application side 112 and the network side 114, interface device 108(1) is at an advantageous position from which to inspect and diagnose problems with hosted applications 106 and/or the computing network 102. In the example shown in FIG. 1B, interface device 108(1) has determined that there is a performance issue, that the performance issue is located on the application side 112 of environment 100, and that the performance issue is associated with application server 104(1). Stated another way, interface device 108(1) has leveraged its diagnostic intelligence to narrow down where the cause of the performance issue is: on the application side 112. As described above, example performance issues originating with an application server 104 may include TCP-related issues, problems with HTTP API requests, problems meeting SLAs, physical equipment failures, etc.

In one example instance, engine 116(1) of interface device 108(1) may have monitored metadata associated with the request 128 and/or the response 130 to identify the performance issue. Engine 116(1) may have reviewed a travel time of request 128 from interface device 108(1) to a particular hosted application 106(1), a travel time of response 130 from the particular hosted application 106(1) back to interface device 108(1), and/or an overall roundtrip travel time (RTT) of the request 128 and the response 130 between the particular hosted application 106(1) and interface device 108(1). More specifically, engine 116(1) may have reviewed metadata received with the response 130 returning from the hosted application 106(1). The metadata may include a timestamp indicating when the request was received at the hosted application 106(1). The metadata may also include another timestamp indicating when the response departed the hosted application 106(1). From this information, engine 116(1) may determine how long the hosted application 106(1) took to prepare the response 130 after receiving the request 128, in other words, a response time. As described above, interface device 108(1) may identify a performance issue when such a response time exceeds a predetermined level, exceeds a response time indicated in an SLA, and/or is out of compliance with some other expectation for the hosted application 106(1). Engine 116(1) may compare a calculated response time, and/or another observation from monitoring the communications, to information contained in library 118(1), for instance. Note that the location of interface device 108(1), positioned on the interface 110 between the application side 112 and the network side 114, allows interface device 108(1) to be able to determine with high accuracy an amount of time a hosted application 106(1) takes to respond to any given request 128. At least in part for this reason, interface device 108(1) is able to determine that a delay in the response 130 was caused by the hosted application 106(1) and/or application server 104(1), and not by any component or device on the network side 114.

Figure 1C:
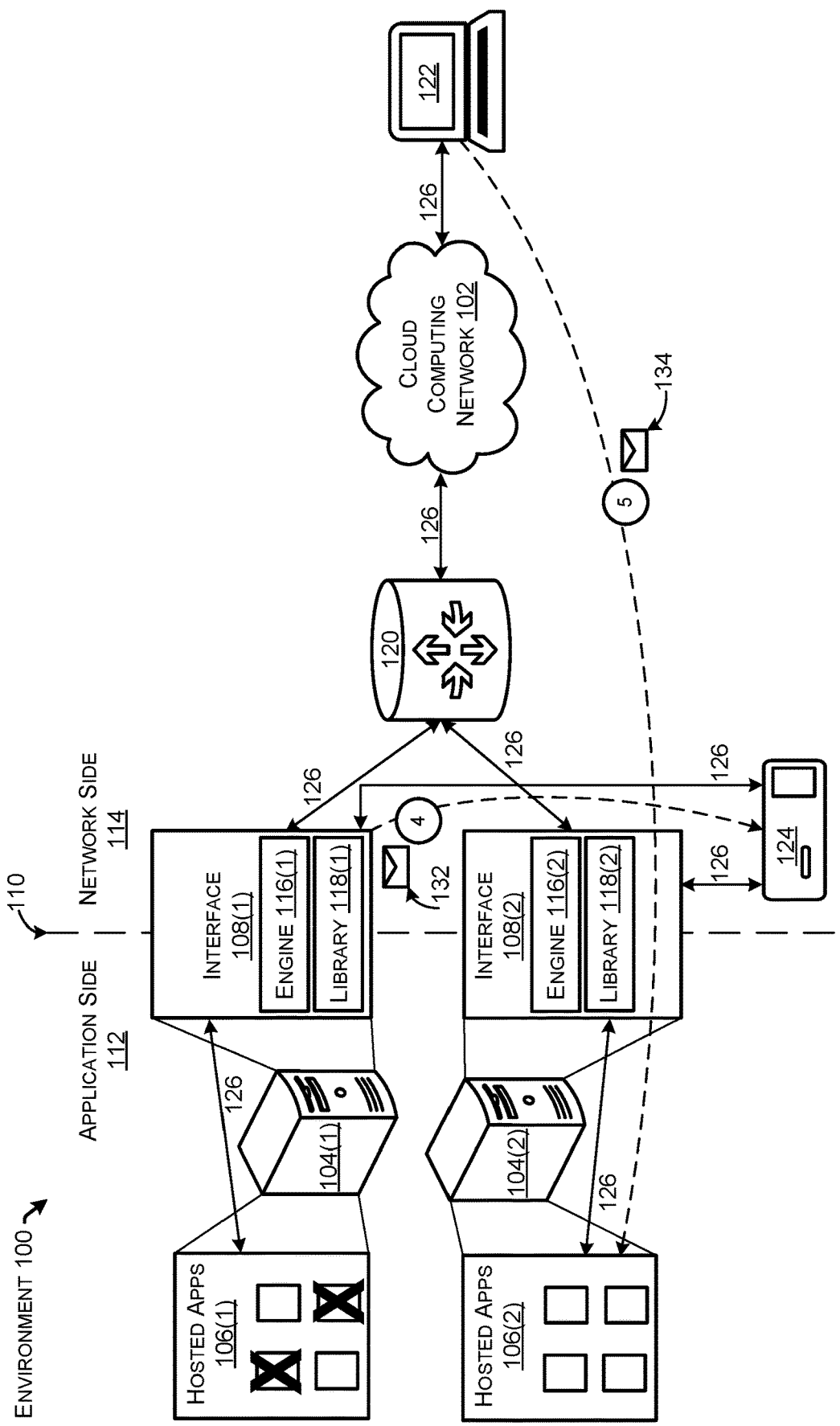

At "Step 4" in FIG. 1C, interface device 108(1) may send a report 132 of the performance issue to controller 124. The report 132 may simply be an indication that a performance issue exists, and/or may provide various additional information. For example, the report 132 may include identification of the location of the performance issue (e.g., application side 112 or network side 114), severity of the performance issue, metadata that were used to identify the performance issue, etc. Interface device 108(1) may report any missed SLAs to controller 124. The report 132 may also include information regarding any action(s) taken to resolve or mitigate the performance issue (described in more detail below).

At "Step 5" in FIG. 1C, controller 124 may respond to the report 132 by taking the hosted application 106(1) or application server 104(1) offline. As shown in the illustrated example in FIG. 1C, controller 124 may redirect a subsequent request 134 to application server 104(2), via interface device 108(2). In this example, the specific information provided by interface device 108(1) to controller 124 in report 132 is instrumental in pinpointing the source of the performance issue and narrowing down options for a successful resolution of the performance issue. Thus, by providing a report 132 to controller 124, interface device 108(1) may be instrumental in quickly restoring service, that may have been failing, to client device 122.

Figure 1D:
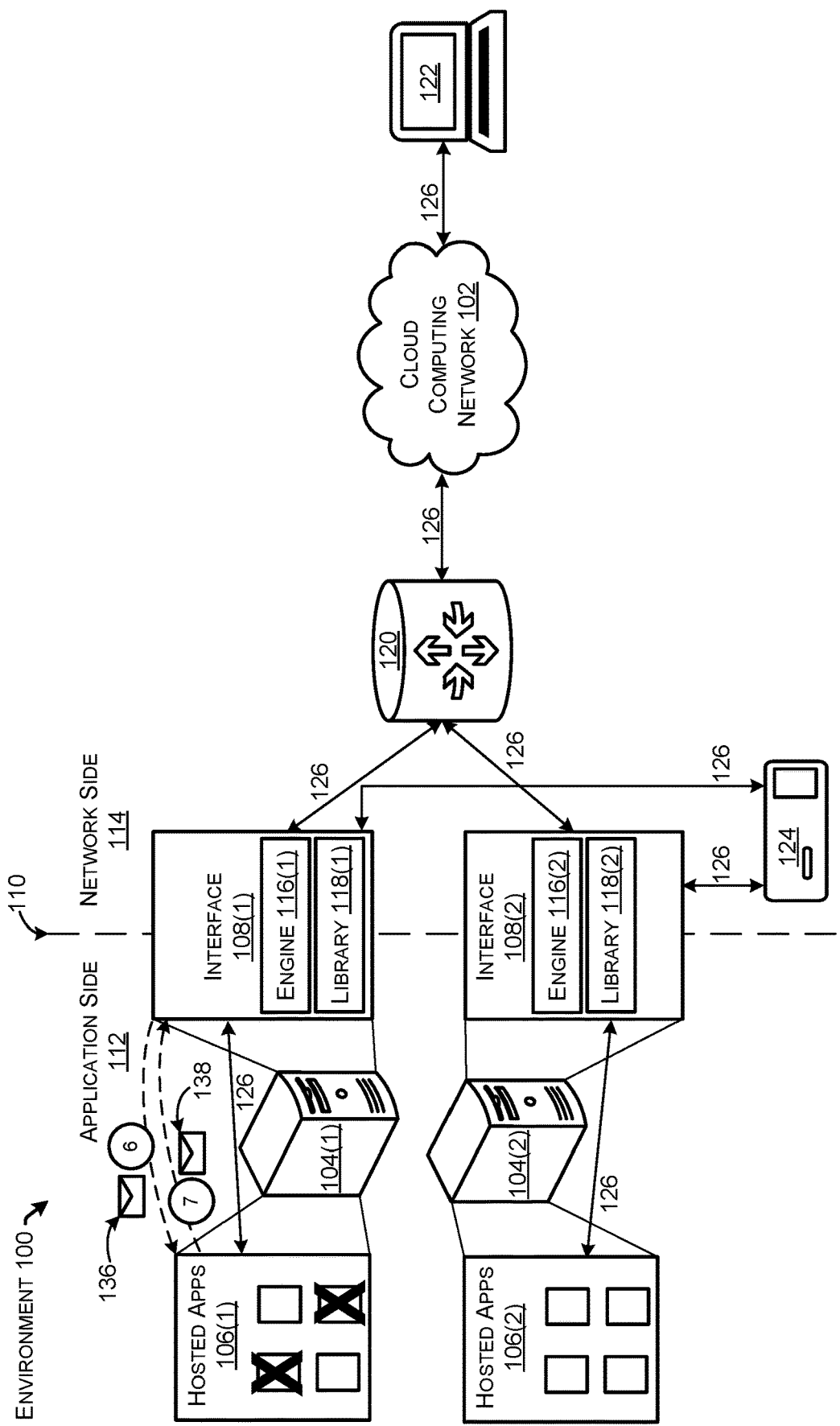

FIG. 1D illustrates an example in which interface device 108(1) may perform a test related to at least one hosted application 106(1). The purpose of the test may be to identify and/or better define a performance issue. At "Step 6" in FIG. 1D, interface device 108(1) sends a test request 136 to a hosted application 106(1). At "Step 7" in FIG. 1D, interface device 108(1) receives a response 138 to the test request 136 from the hosted application 106(1). In some examples, engine 116(1) may use a test request 136 from library 118(1) for purposes of checking the performance of the hosted application 106(1). Additionally or alternatively, as described above, the test request may be intended to mimic an actual request from a client. For example, interface device 108(1) may generate test request 136 to be similar to or potentially the same as request 128. Interface device 108(1) may then send test request 136 to the hosted application 106(1). Based on the response 138, interface device 108(1) may determine that a response time of the hosted application 106(1) is out of compliance with expectations. Results of such tests of hosted application 106(1), including test failures and/or test successes, may be reported to controller 124, such as in report 132 (see FIG. 1C). Note that in general, a test may be performed by an interface device 108 regardless of whether a potential performance issue has been previously detected.

Figure 1E:
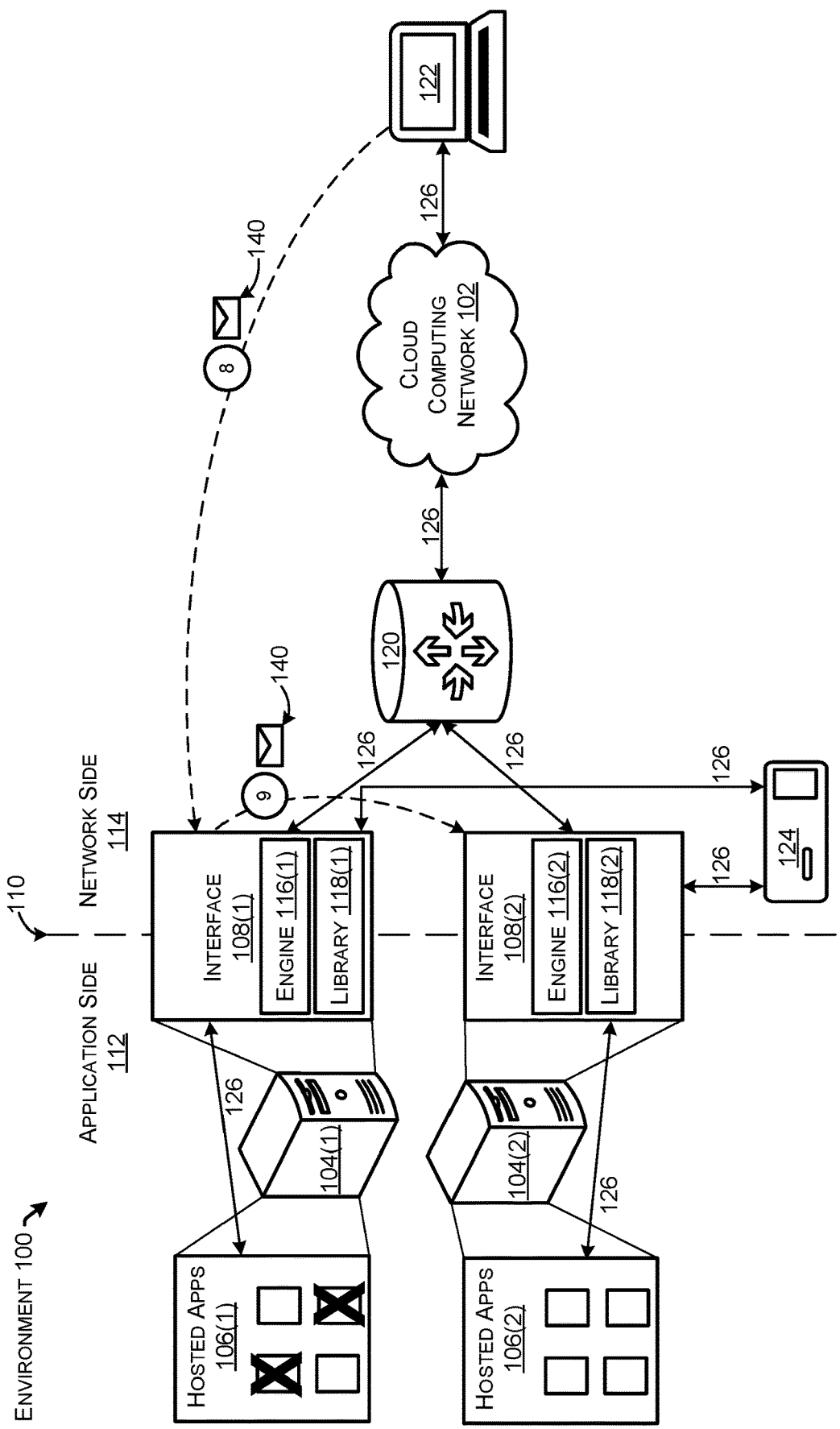

FIG. 1E illustrates an example in which interface device 108(1) may attempt to mitigate a performance issue to improve service to a client device 122. In the example in FIG. 1E, interface device 108(1) may have identified a performance issue with a hosted application 106(1) on application server 104(1). In some cases, in response, the interface device 108(1) may simply forward subsequent requests to a different instance of a hosted application 106(1) on application server 104(1) that is not experiencing a known performance issue. In other cases, as shown at "Step 8" in FIG. 1E, interface device 108(1) may intercept and/or redirect a subsequent request 140 from client device 122. At "Step 9" in FIG. 1E, interface device 108(1) may forward the subsequent request 140 to application server 104(2), rather than letting the subsequent request 140 travel through to the hosted application(s) 106(1) on application server 104(1). In this manner, interface device 108(1) facilitates the subsequent request 140 being serviced by a hosted application 106(2) on application server 104(2). In some implementations, after identifying a performance issue at a hosted application 106(1), interface device 108(1) may simply direct any subsequent inbound request to another application server to avoid sending requests to the comprised hosted application 106(1) on application server 104(1). In other implementations, interface device 108(1) may communicate with other devices in the system, such as interface device 108(2), controller 124, etc., to determine a suitable alternative destination for a subsequent inbound request. For instance, interface device 108(1) may communicate with interface device 108(2) to determine whether a properly functioning hosted application 106(2) is available on application server 104(2). Upon receiving confirmation of an available, properly functioning hosted application 106(2), interface device 108(1) may then forward the subsequent request 140 to application server 104(2). In some examples, redirection of inbound requests may be dependent on a type of network deployment, including destination MAC change, destination network address translation, NFV chain modification, etc.

It should also be appreciated that more or fewer steps might be performed than shown in the FIGS. 1A-1E and described herein. These steps may also be performed in parallel, or in a different order than described herein. Some or all of these steps may also be performed by components other than those specifically identified. Although the steps and/or techniques described in these examples is with reference to specific devices, in other examples, the techniques may be implemented by less devices, more devices, different devices, or any configuration of devices and/or components.

Figure 2B:
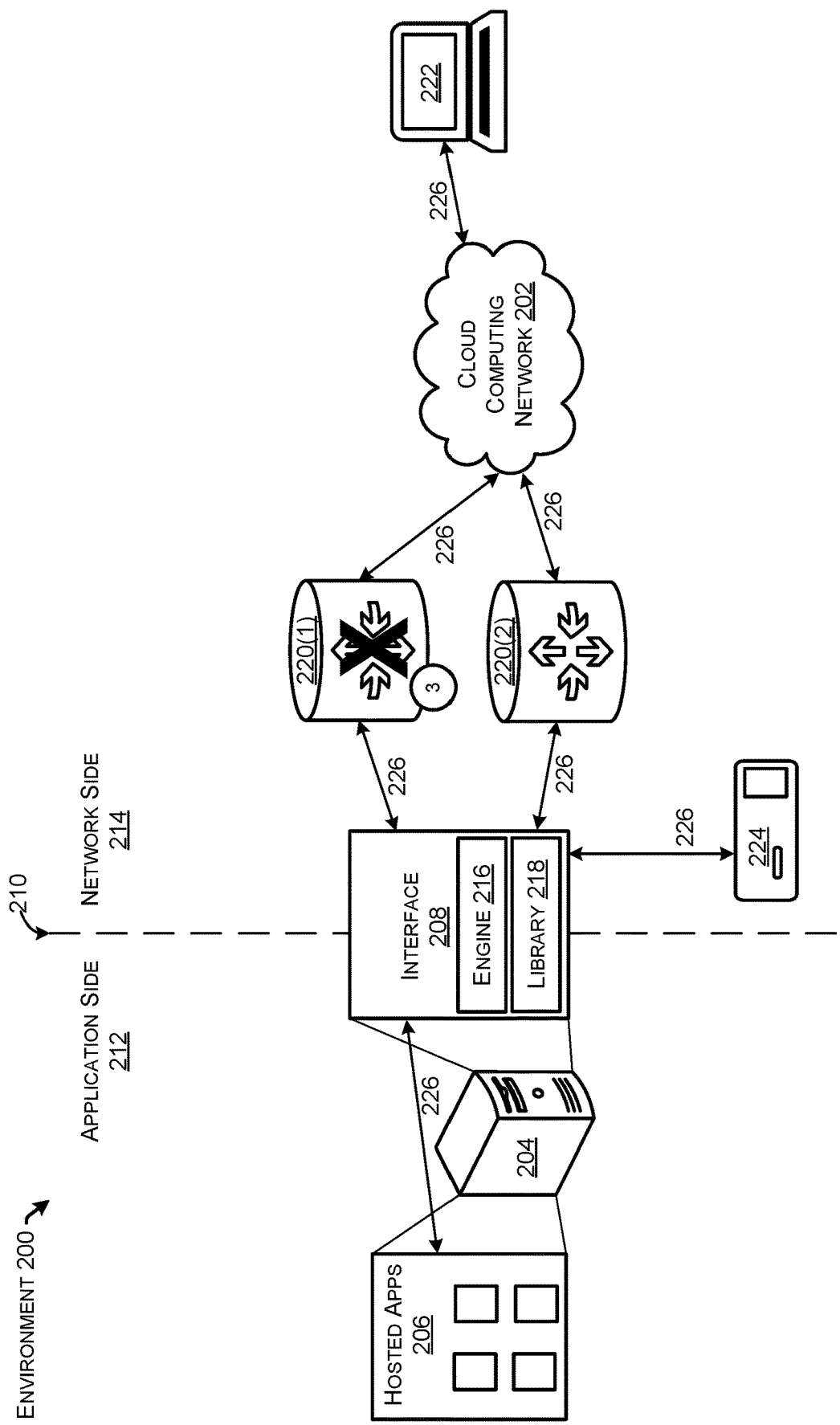
Figure 2C:
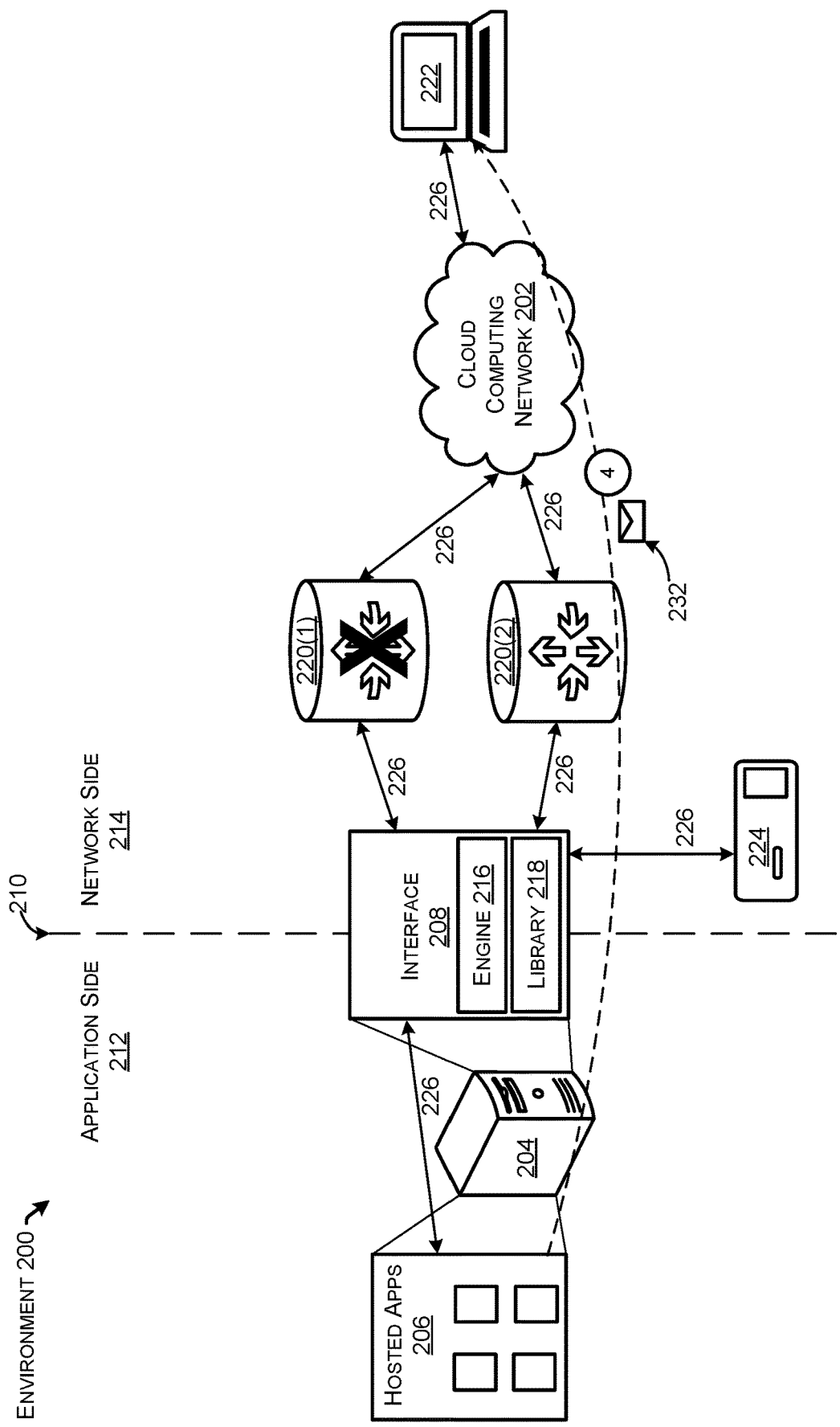

FIGS. 2A-2C collectively illustrate additional example scenarios in accordance with the present communication monitoring concepts. FIGS. 2A-2C collectively illustrate an example environment 200. Some aspects of the examples shown in FIGS. 2A-2C may be similar to aspects of the examples described above relative to FIGS. 1A-1E. Therefore, for sake of brevity, not all elements of FIGS. 2A-2C will be described in detail.

Example environment 200 may include computing network 202 and application server 204. Application server 204 may host one or more hosted applications 206. Application server 204 may include interface device 208, which may be positioned at imaginary interface 210 between an application side 212 and a network side 214 of environment 200. Interface device 208 may include an engine 216 and/or a library 218. Interface device 208 may be connected to the computing network 202 via one or more routers 220. Environment 200 may also include at least one client device 222 and/or a controller 224. In general, application server 204, interface device 208, routers 220, client device 222, controller 224, and/or other devices may be communicatively coupled indicated by double arrows 226.

At "Step 1" in FIG. 2A, client device 222 may send a request 228 to application server 204. At "Step 2," application server 204 may send a response 230 to client device 222. Interface device 208 may monitor the request 228, the response 230, and/or other communications in environment 200. Furthermore, interface device 208 may perform tests of hosted applications 206, similar to the test described above relative to FIG. 1D.

At "Step 3" in FIG. 2B, interface device 208 may identify a performance issue with router 220(1), represented with an "X" mark across router 220(1). Therefore, in this example, interface device 208 has identified a performance issue on the network side 214 of environment 200, in contrast to the example performance issue on the application side 212 depicted in the examples in FIGS. 1A-1E. In some examples, performance issues on the network side 214 may include problems originating anywhere from the interface 108 to the client device 222. As described earlier, performance issues on the network side 214 may include secure socket layer (SSL) or transport layer security (TLS) client problems, unsupported ciphers, inbound denial of service (DOS) or distributed denial of service (DDOS) attacks, packet drops on the computing network, physical hardware issues with any of a variety of network devices including router 220(1), etc. Performance issues originating with client device 222 may include high latency and/or jitter, for instance. Interface device 208 may report the performance issue to controller 224, including an indication that the performance issue is on the network side 214 and/or any associated metadata.

At "Step 4" in FIG. 2C, interface device 208 (and/or controller 224) may take action in response to the performance issue by redirecting a subsequent response 232 to an alternative router 220(2). Stated another way, where a performance issue is found to be associated with a particular segment or portion of a network, subsequent communications may be redirected away from the segment of the network experiencing the performance issue. In the example in FIG. 2C, the response 232 is sent to client device 222 by bypassing the router 220(1) that is associated with the performance issue. Additionally or alternatively, interface device 208 and/or controller 224 may cause future communications from client device 222 to be sent to a hosted application 206 via a route that bypasses the known performance issue at router 220(1). In some implementations, interface device 208 and/or controller 224 may employ source routing to find an alternative route for communications from the client device 222 to a hosted application 206. Thus, interface device 208 may be instrumental in quickly restoring service to client device 222, which may have been experiencing substandard service where communications were routed through a segment of the network experiencing the performance issue. Interface device 208 may assist with restoring service either by taking the initiative to bypass a problematic network segment, or by providing information to another device, such as controller 224 so that a bypass may be implemented.

Figure 3:
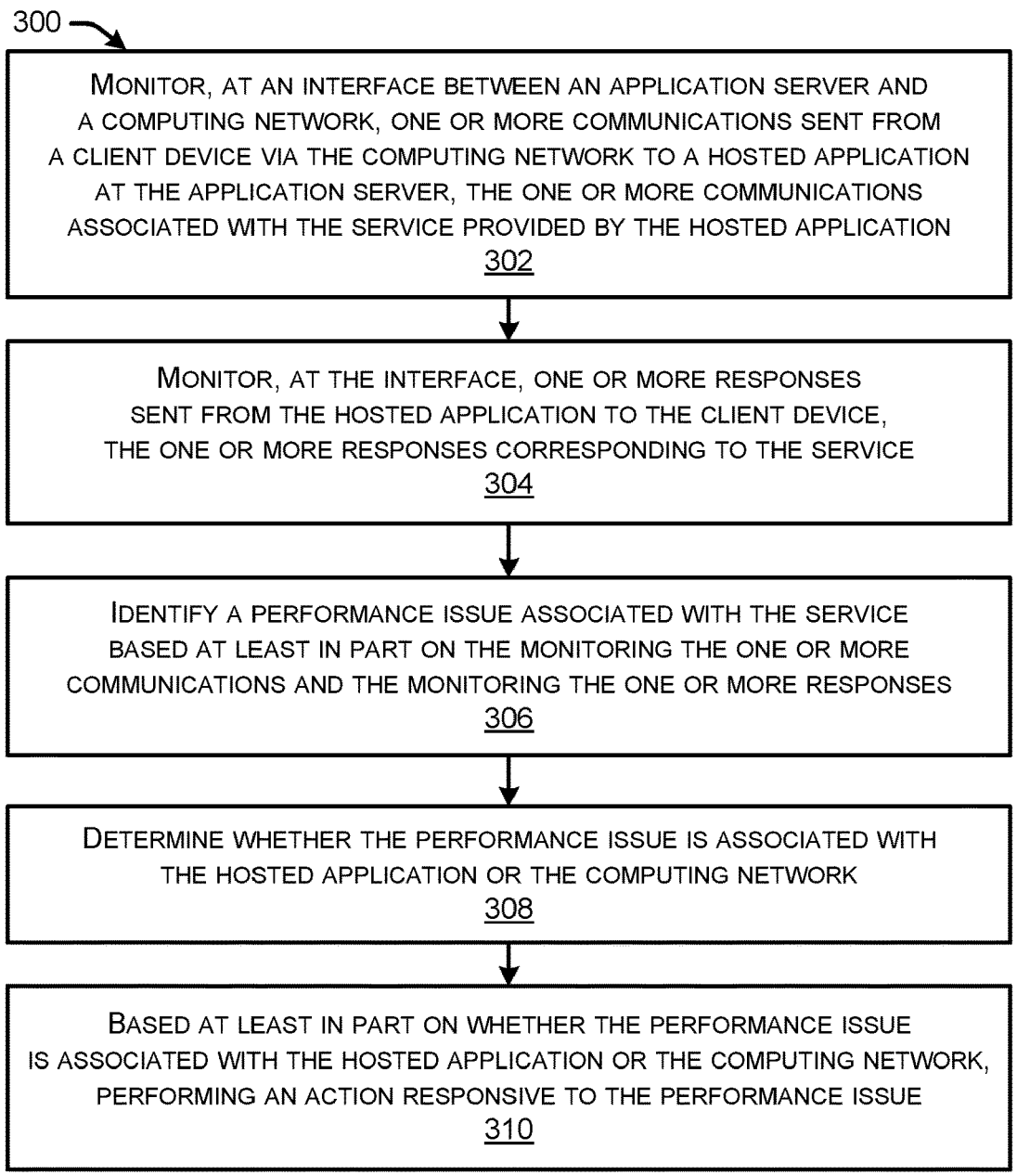
FIGS. 3-5 illustrate flow diagrams of example methods for the use of communications monitoring among network devices, in accordance with the present concepts.
Figure 4:
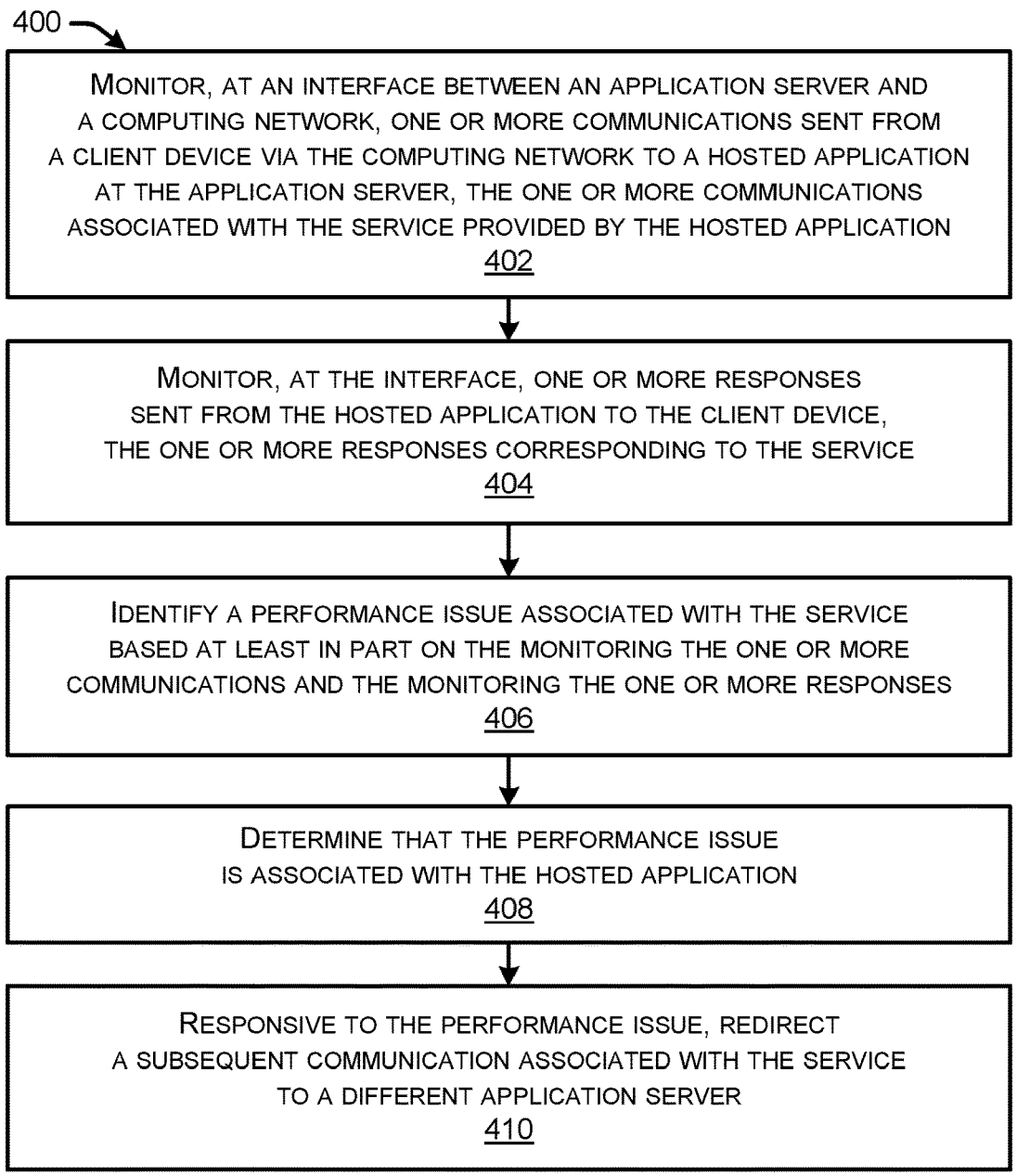
Figure 5:
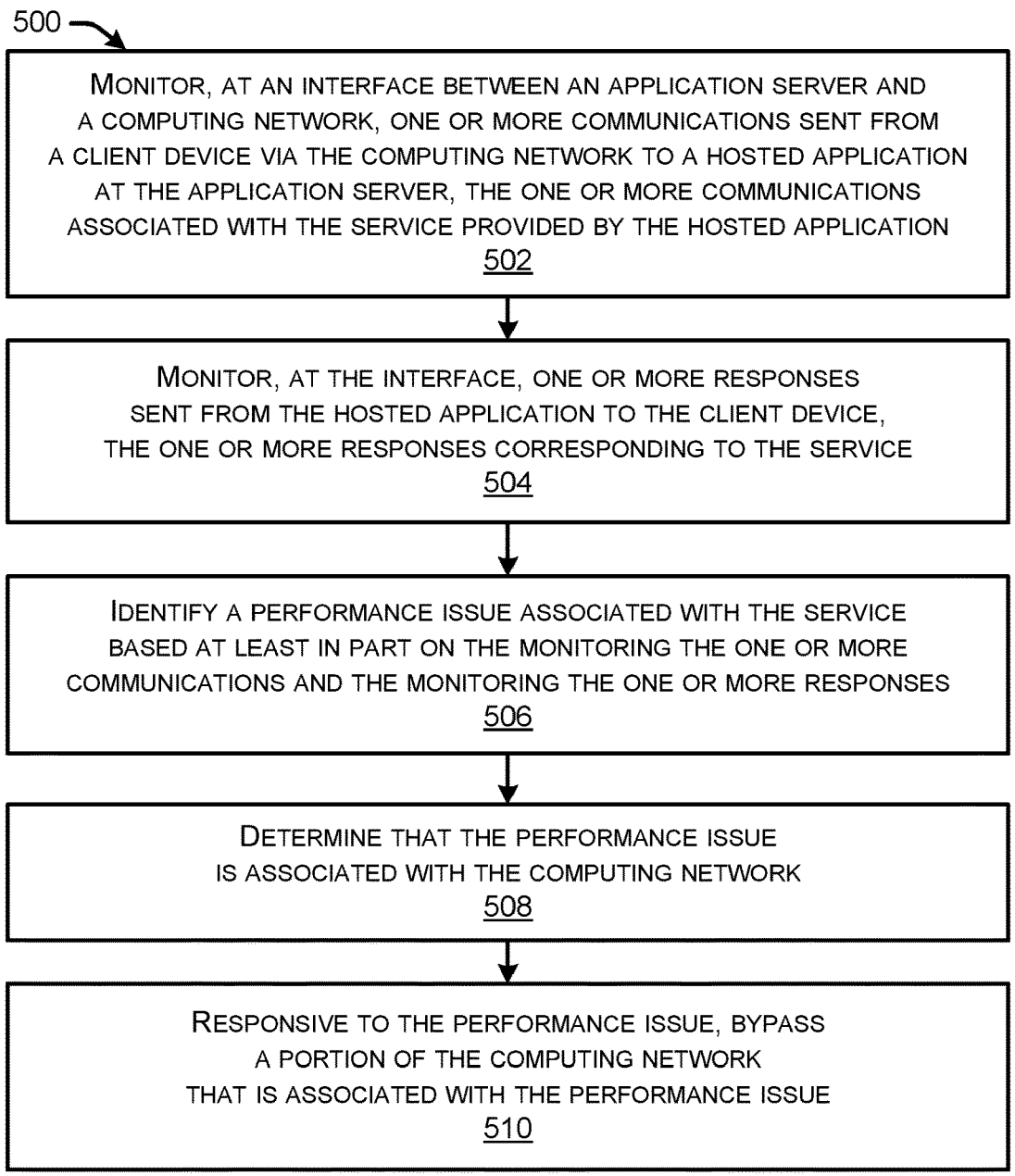

FIGS. 3-5 illustrate flow diagrams of example methods 300, 400, and 500 that include functions that may be performed at least partly by an interface device, such as interface devices 108 or 208 described relative to FIGS. 1A-2C. In some examples, method 300 may be viewed as an interface process performed by an interface device. The logical operations described herein with respect to FIGS. 3-5 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 3-5 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 3 illustrates a flow diagram of an example method 300 for a network device to perform communication monitoring techniques. Method 300 may be performed by an interface device (e.g., interface device 108 or 208) and/or an application server (e.g., application server 104 or 204) communicatively coupled to a client device (e.g., client device 122 or 222), for instance. In some examples, method 300 may be performed by a computing device comprising one or more processors and one or more non-transitory computer-readable media storing computer-executable instructions that, when executed by the one or more processors, cause the one or more processors to perform method 300.

At 302, method 300 may include monitoring, at an interface between an application server and a computing network, one or more communications sent from a client device via the computing network to a hosted application at the application server, the one or more communications associated with the service provided by the hosted application.

At 304, method 300 may include monitoring, at the interface, one or more responses sent from the hosted application to the client device, the one or more responses corresponding to the service. The one or more responses may be responses to the one or more communications, for instance.

At 306, method 300 may include identifying a performance issue associated with the service based at least in part on the monitoring the one or more communications and the monitoring the one or more responses. The performance issue may comprise increased latency associated with execution of the hosted application on the computing device, for instance.

At 308, method 300 may include determining whether the performance issue is associated with the hosted application or the computing network.

At 310, based at least in part on whether the performance issue is associated with the hosted application or the computing network, method 300 may include performing an action responsive to the performance issue. In an instance where the performance issue is associated with the hosted application, the action may comprise redirecting a subsequent communication associated with the service to a different computing device, for instance. In another example, in an instance where the performance issue is associated with the computing network, the action may comprise bypassing a portion of the computing network associated with the performance issue. The interface may employ source routing in order to effectively bypass the portion of the computing network associated with the performance issue, in some cases. Additionally or alternatively, the action may comprise sending, to a controller, an indication of the performance issue. The indication sent to the controller may include information identifying whether the performance issue is associated with the hosted application or the computing network.

In some cases, method 300 may further include sending a test request to the hosted application, and/or receiving a test response from the hosted application. The sending of a test request and/or test response may be part of an ongoing unit test operation, or may be the action in response to an identified or suspected performance issue. In some cases, the interface device may determine a round trip time (RTT) associated with the hosted application based on the test request and the test response. Method 300 may include determining whether the RTT is in compliance with a service level agreement (SLA) of the hosted application. For example, the interface device may check the RTT against SLA information contained in a intellectual capital library. Method 300 may further comprise sending a representation of the test request and/or test response to a controller. The representation may include data related to the RTT, for instance. The representation may be sent in response to the RTT being out of compliance with an SLA of a corresponding hosted application, in some cases.

FIG. 4 illustrates a flow diagram of an example method 400 for a network device to perform communication monitoring techniques. Method 400 may be performed by an interface device (e.g., interface device 108 or 208) and/or an application server (e.g., application server 104 or 204) communicatively coupled to a client device (e.g., client device 122 or 222), for instance. In some examples, method 400 may be performed by a computing device comprising one or more processors and one or more non-transitory computer-readable media storing computer-executable instructions that, when executed by the one or more processors, cause the one or more processors to perform method 400.

At 402, method 400 may include monitoring, at an interface between an application server and a computing network, one or more communications sent from a client device via the computing network to a hosted application at the application server, the one or more communications associated with the service provided by the hosted application.

At 404, method 400 may include monitoring, at the interface, one or more responses sent from the hosted application to the client device, the one or more responses corresponding to the service.

At 406, method 400 may include identifying a performance issue associated with the service based at least in part on the monitoring the one or more communications and the monitoring the one or more responses.

At 408, method 400 may include determining that the performance issue is associated with the hosted application. For example, the performance issue may be viewed as an "application side" issue, rather than a "network side" issue. As used herein, a performance issue associated with the hosted application may include an issue related to the application server hosting the hosted application.

At 410, responsive to the performance issue, method 400 may include redirecting a subsequent communication associated with the service to a different application server. In some examples, redirecting may include causing the subsequent communication to be sent to the different application server. In other examples, redirecting may include forwarding the subsequent communication from an application server associated with the performance issue to the different application server.

FIG. 5 illustrates a flow diagram of an example method 500 for a network device to perform communication monitoring techniques. Method 500 may be performed by an interface device (e.g., interface device 108 or 208) and/or an application server (e.g., application server 104 or 204) communicatively coupled to a client device (e.g., client device 122 or 222), for instance. In some examples, method 500 may be performed by a computing device comprising one or more processors and one or more non-transitory computer-readable media storing computer-executable instructions that, when executed by the one or more processors, cause the one or more processors to perform method 500.

At 502, method 500 may include monitoring, at an interface between an application server and a computing network, one or more communications sent from a client device via the computing network to a hosted application at the application server, the one or more communications associated with the service provided by the hosted application.

At 504, method 500 may include monitoring, at the interface, one or more responses sent from the hosted application to the client device, the one or more responses corresponding to the service.

At 506, method 500 may include identifying a performance issue associated with the service based at least in part on the monitoring the one or more communications and the monitoring the one or more responses.

At 508, method 500 may include determining that the performance issue is associated with the computing network. For example, the performance issue may be viewed as a "network side" issue, rather than an "application side" issue.

At 510, responsive to the performance issue, method 500 may include bypassing a portion of the computing network that is associated with the performance issue. Source routing may be employed to determine a suitable alternative route for subsequent communications between the client device and hosted application.

Figure 6:
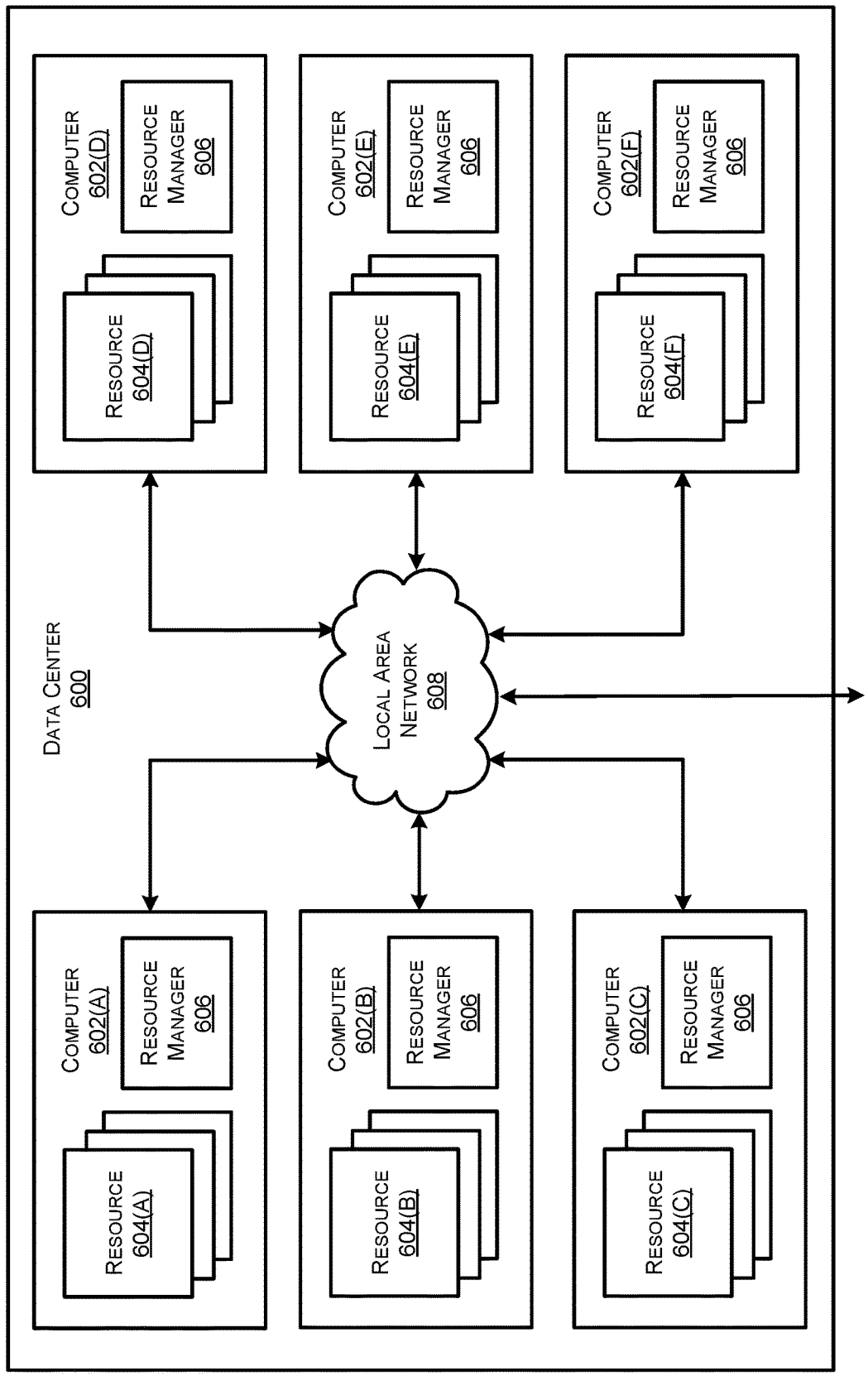
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several computers 602A-602F (which might be referred to herein singularly as "a computer 602" or in the plural as "the computers 602") for providing computing resources. In some examples, the resources and/or computers 602 may include, or correspond to, any type of networked device described herein, such as an application server (104 or 204) and/or client device (122 or 222). Although, computers 602 may comprise any type of networked device, such as servers, switches, routers, hubs, bridges, gateways, modems, repeaters, access points, hosts, etc.

The computers 602 can be standard tower, rack-mount, or blade server computers configured appropriately for providing computing resources. In some examples, the computers 602 may provide computing resources 604 including data processing resources such as virtual machine (VM) instances or hardware computing systems, database clusters, computing clusters, storage clusters, data storage resources, database resources, networking resources, and others. Some of the computers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single computer 602. Computers 602 in the data center 600 can also be configured to provide network services and other types of services.

In the example data center 600 shown in FIG. 6, an appropriate local area network (LAN) 608 is also utilized to interconnect the computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the computers 602A-602F in each data center 600, and, potentially, between computing resources in each of the computers 602. It should be appreciated that the configuration of the data center 600 described with reference to FIG. 6 is merely illustrative and that other implementations can be utilized.

In some examples, the computers 602 may each execute one or more application containers and/or virtual machines to perform techniques described herein. For instance, the containers and/or virtual machines may serve as server devices, user devices, and/or routers in the cloud computing network 102 or 202.

In some instances, the data center 600 may provide computing resources, like application containers, VM instances, and storage, on a permanent or an as-needed basis. Among other types of functionality, the computing resources provided by a cloud computing network may be utilized to implement the various services and techniques described above. The computing resources 604 provided by the cloud computing network can include various types of computing resources, such as data processing resources like application containers and VM instances, data storage resources, networking resources, data communication resources, network services, and the like.

Each type of computing resource 604 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 604 not mentioned specifically herein.

The computing resources 604 provided by a cloud computing network may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 7.

Figure 7:
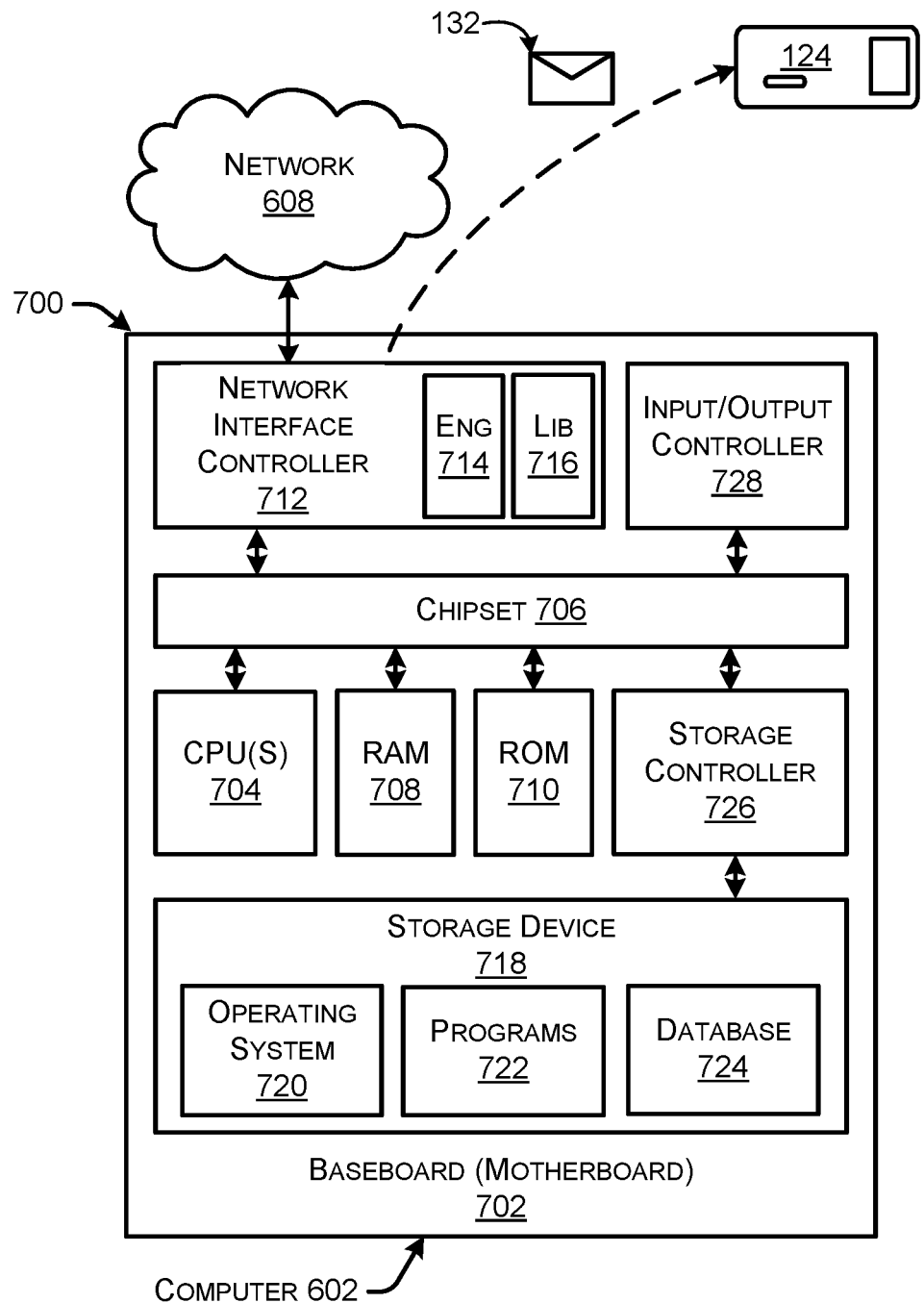
FIG. 7 is a computer architecture diagram showing an illustrative computer hardware architecture for implementing a device that can be utilized to implement aspects of the various technologies presented herein.

FIG. 7 shows an example computer architecture 700 for a computer 602 capable of executing program components for implementing the functionality described above. The computer architecture 700 shown in FIG. 7 illustrates a conventional server computer, workstation, desktop computer, laptop, tablet, network appliance, e-reader, smartphone, and/or other computing device, and can be utilized to execute any of the software components presented herein. The computer 602 may, in some examples, correspond to a physical device described herein (e.g., server device, user device, router, etc.), and may comprise networked devices such as servers, switches, routers, hubs, bridges, gateways, modems, repeaters, access points, etc. For instance, computer 602 may correspond to application server 104 or 204.

As shown in FIG. 7, the computer 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 602. The chipset 706 can further provide an interface to a computer-readable storage medium such as a read-only memory ("ROM") 710 or non-volatile RAM ("NVRAM") for storing basic routines that help to startup the computer 602 and to transfer information between the various components and devices. The ROM 710 or NVRAM can also store other software components necessary for the operation of the computer 602 in accordance with the configurations described herein.

The computer 602 can operate in a networked environment using logical connections to remote computing devices and computer systems through a network, such as the networks 102, 202, and/or 608. The chipset 706 can include functionality for providing network connectivity through a network interface controller (NIC) 712 (which may be similar to interface device 108 or 208), such as a gigabit Ethernet adapter. The NIC 712 is capable of connecting the computer 602 to other computing devices over the network 102. For instance, in the example shown in FIG. 7, NIC 712 may help facilitate transfer of data, packets, and/or communications, such as requests 128 and/or responses 130, over the network 608 (e.g., computing network 102) with client device 122 or 222. Also, the NIC 712 may transfer data, packets, and/or communications, such as reports 132, with a controller (e.g., controller 124 or 224). It should be appreciated that multiple NICs 712 can be present in the computer 602, connecting the computer to other types of networks and remote computer systems. Further, the NIC 712 may be a "SmartNIC." For instance, the NIC 712 may include an engine 714 (which may be similar to engine 116 or 216 in FIGS. 1A-2C) and/or a library 716 (which may be similar to library 118 or 218 in FIGS. 1A-2C). The engine 714 may be capable of running any type of programs or processes to perform the techniques described in this disclosure in accordance with communication monitoring techniques, such as the techniques described above with regard to FIGS. 1A-5. For instance, the engine 714 may perform techniques for communicating with other devices using any type of protocol or standard usable for determining connectivity. Additionally, the library 716 may include instructions, protocols, and/or programs that cause the engine 714 to perform specific techniques for monitoring communications.

The computer 602 can be connected to a storage device 718 that provides non-volatile storage for the computer. The storage device 718 can store an operating system 720, programs 722, databases 724, and/or other data. The storage device 718 can be connected to the computer 602 through a storage controller 726 connected to the chipset 706, for example. The storage device 718 can consist of one or more physical storage units. The storage controller 726 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 602 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 602 can store information to the storage device 718 by issuing instructions through the storage controller 726 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 can further read information from the storage device 718 by detecting the physical states or characteristics of one or more particular locations within the physical storage units.

In addition to the mass storage device 718 described above, the computer 602 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 602. In some examples, the operations performed by the network 102, and or any components included therein, may be supported by one or more devices similar to computer 602. Stated otherwise, some or all of the operations performed by the network 102, and or any components included therein, may be performed by one or more computer devices 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 602. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 718 can store other system or application programs and data utilized by the computer 602.

In one embodiment, the storage device 718 or other computer-readable storage media is encoded with computer-executable instructions which, when loaded into the computer 602, transform the computer from a general-purpose computing system into a special-purpose computer capable of implementing the embodiments described herein. These computer-executable instructions transform the computer 602 by specifying how the CPUs 704 transition between states, as described above. According to one embodiment, the computer 602 has access to computer-readable storage media storing computer-executable instructions which, when executed by the computer 602, may perform various processes. For instance, the processes may be associated with the hosted applications 106, supplying elements of a service to a client device, such as client device(s) 122 or 222. The computer 602 can also include computer-readable storage media having instructions stored thereupon for performing any of the other computer-implemented operations described herein.

The computer 602 can also include one or more input/output controllers 728 for receiving and processing input from a number of input devices, such as a keyboard, a mouse, a touchpad, a touch screen, an electronic stylus, or other type of input device. Similarly, an input/output controller 728 can provide output to a display, such as a computer monitor, a flat-panel display, a digital projector, a printer, or other type of output device. It will be appreciated that the computer 602 might not include all of the components shown in FIG. 7, can include other components that are not explicitly shown in FIG. 7, or might utilize an architecture completely different than that shown in FIG. 7.

As described herein, the computer 602 may comprise one or more devices, such as application server 104 or 204, client devices 122 or 222, and/or other devices. The computer 602 may include one or more hardware processors 704 (processors) configured to execute one or more stored instructions. The processor(s) 704 may comprise one or more cores. Further, the computer 602 may include one or more network interfaces configured to provide communications between the computer 602 and other devices, such as the communications described herein as being performed by application server 104 and 204 and client devices 122 and 222, and/or other devices. In some examples, the communications may include a request, a response, data, a packet, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure in accordance with client services. For instance, the programs 722 may cause the computer 602 to perform techniques for communicating with other devices using any type of protocol or standard usable for providing a service. Additionally, the programs 722 may comprise instructions that cause the computer 602 to perform services related to the hosted applications 106 or 206.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computing device comprising:
one or more non-transitory computer-readable media storing a first portion of computer-executable instructions related to a hosted application that provides a service to a client device and storing a second portion of computer-executable instructions related to an interface process;
at least a first processor of the computing device that executes the first computer-executable instructions;
at least a second processor of the computing device that executes the second computer-executable instructions, wherein the second portion of the computer-executable instructions cause the second processor of the computing device to:
monitor, at an interface between the computing device and a computing network, one or more communications sent from the client device via the computing network to the hosted application on the computing device, the one or more communications associated with the service provided by the hosted application on the computing device;
monitor, at the interface, one or more responses sent from the hosted application to the client device, the one or more responses corresponding to the service;
identify a performance issue associated with the service based at least in part on the monitoring the one or more communications and the monitoring the one or more responses;
determine whether the performance issue is associated with the hosted application or the computing network; and
based at least in part on whether the performance issue is associated with the hosted application or the computing network, perform an action responsive to the performance issue.

2. The computing device of claim 1, wherein the second processor is manifest as a network interface controller of the computing device.

3. The computing device of claim 2, wherein the first processor is manifest as a central processing unit of the computing device.

4. The computing device of claim 1, wherein the performance issue comprises increased latency associated with execution of the hosted application on the computing device.

5. The computing device of claim 1, wherein, in an instance where the performance issue is associated with the hosted application on the computing device, the action comprises redirecting a subsequent communication associated with the service to a different computing device.

6. The computing device of claim 1, wherein, in an instance where the performance issue is associated with the hosted application on the computing device, the action comprises redirecting a subsequent communication associated with the service to a different hosted application on the computing device.

7. The computing device of claim 1, wherein, in an instance where the performance issue is associated with the hosted application on the computing device, the action comprises sending, to a controller, an indication that the performance issue is associated with the hosted application.

8. The computing device of claim 7, wherein the second portion of the computer-executable instructions further cause the second processor to:
send a test request to the hosted application; and
receive a test response from the hosted application,
wherein the action further comprises sending a representation of the test response to the controller.

9. A computer-implemented method comprising:
monitoring, at an interface between an application server and a computing network, one or more communications sent from a client device via the computing network to a hosted application at the application server, the one or more communications associated with a service provided by the hosted application;
monitoring, at the interface, one or more responses sent from the hosted application to the client device, the one or more responses corresponding to the service;
identifying a performance issue associated with the service based at least in part on the monitoring the one or more communications and the monitoring the one or more responses;
determining whether the performance issue is associated with the hosted application or the computing network; and
based at least in part on whether the performance issue is associated with the hosted application or the computing network, performing an action responsive to the performance issue.

10. The computer-implemented method of claim 9, wherein:
the interface comprises a first virtual resource running on the application server; and
the hosted application executes in a second virtual resource running on the application server.

11. The computer-implemented method of claim 9, wherein:
the hosted application is executed by a central processing unit of the application server; and
the computer-implemented method is performed by a network interface controller of the application server.

12. The computer-implemented method of claim 9, wherein the performance issue comprises increased latency associated with execution of the hosted application on the application server.

13. The computer-implemented method of claim 9, wherein, in an instance where the performance issue is associated with the hosted application, the action comprises redirecting a subsequent communication associated with the service to a different application server.

14. The computer-implemented method of claim 9, wherein, in an instance where the performance issue is associated with the computing network, the action comprises employing source routing to bypass a portion of the computing network associated with the performance issue.

15. The computer-implemented method of claim 9, wherein, in an instance where the performance issue is associated with the hosted application, the action comprises sending, to a controller, an indication that the performance issue is associated with the hosted application.

16. The computer-implemented method of claim 15, further comprising:
sending a test request to the hosted application; and
receiving a test response from the hosted application,
wherein the action further comprises sending a representation of the test response to the controller.

17. An interface device of an application server, the interface device comprising:
at least one processor; and non-transitory computer-readable media storing computer-executable instructions that, when executed by the at least one processor, cause the at least one processor to:

monitor one or more communications sent from a client device via a computing network to a hosted application on then application server, the one or more communications associated with a service provided by the hosted application;

monitor one or more responses sent from the hosted application to the client device, the one or more responses associated with the service;

identify a performance issue associated with the service based at least in part on monitoring the one or more communications and monitoring the one or more responses;

determine whether the performance issue is associated with the hosted application on the application server or associated with the computing network; and perform an action responsive to the performance issue.

18. The interface device of claim 17, wherein, in an instance where the performance issue is with the hosted application, the action comprises communicating with a second interface device to redirect a subsequent communication associated with the service to a second application server associated with the second interface device.

19. The interface device of claim 17, wherein the computer-executable instructions further cause the at least one processor to:

send a test request to the hosted application on the application server;

receive a test response from the hosted application; and based on the test request and the test response, determine a round trip time (RTT) associated with the hosted application.

20. The interface device of claim 19, wherein, in an instance where the RTT is out of compliance with a service level agreement (SLA) of the hosted application, the action comprises sending an indication of the performance issue to a controller.

* * * * *